United States Patent
Clayton

[15] 3,692,281
[45] Sept. 19, 1972

[54] NESTABLE TRAFFIC MARKER

[72] Inventor: George W. Clayton, 4059 S. Wisteria Way, Denver, Colo. 80237

[22] Filed: Sept. 15, 1971

[21] Appl. No.: 180,605

[52] U.S. Cl. ..................256/64, 256/1, 40/125 M
[51] Int. Cl. ..................................................E01f 9/00
[58] Field of Search ..............256/64, 13.1, 1; 94/1.5; 40/125 M; 116/63 P

[56]  References Cited

UNITED STATES PATENTS

| | | | |
|---|---|---|---|
| 2,864,331 | 12/1958 | Brands | 116/63 P |
| 2,929,349 | 3/1960 | Klett | 116/63 P |
| 3,322,093 | 5/1967 | Goland et al. | 116/63 P |
| 3,289,939 | 12/1966 | Martinov | 94/1.5 X |
| 3,475,009 | 10/1969 | Brown | 256/64 |
| 3,589,328 | 6/1971 | Kiniry et al. | 94/1.5 X |

FOREIGN PATENTS OR APPLICATIONS

| | | | |
|---|---|---|---|
| 1,266,448 | 5/1961 | France | 94/1.5 |
| 1,424,957 | 10/1966 | France | 94/1.5 |

Primary Examiner—Dennis L. Taylor
Attorney—Sheridan, Ross & Fields

[57] ABSTRACT

Traffic marker characterized by three members, each formed from a side wall and bead of a pneumatic tire, the members being hinged together for movement from a generally flat nesting relationship to an erect position.

4 Claims, 5 Drawing Figures

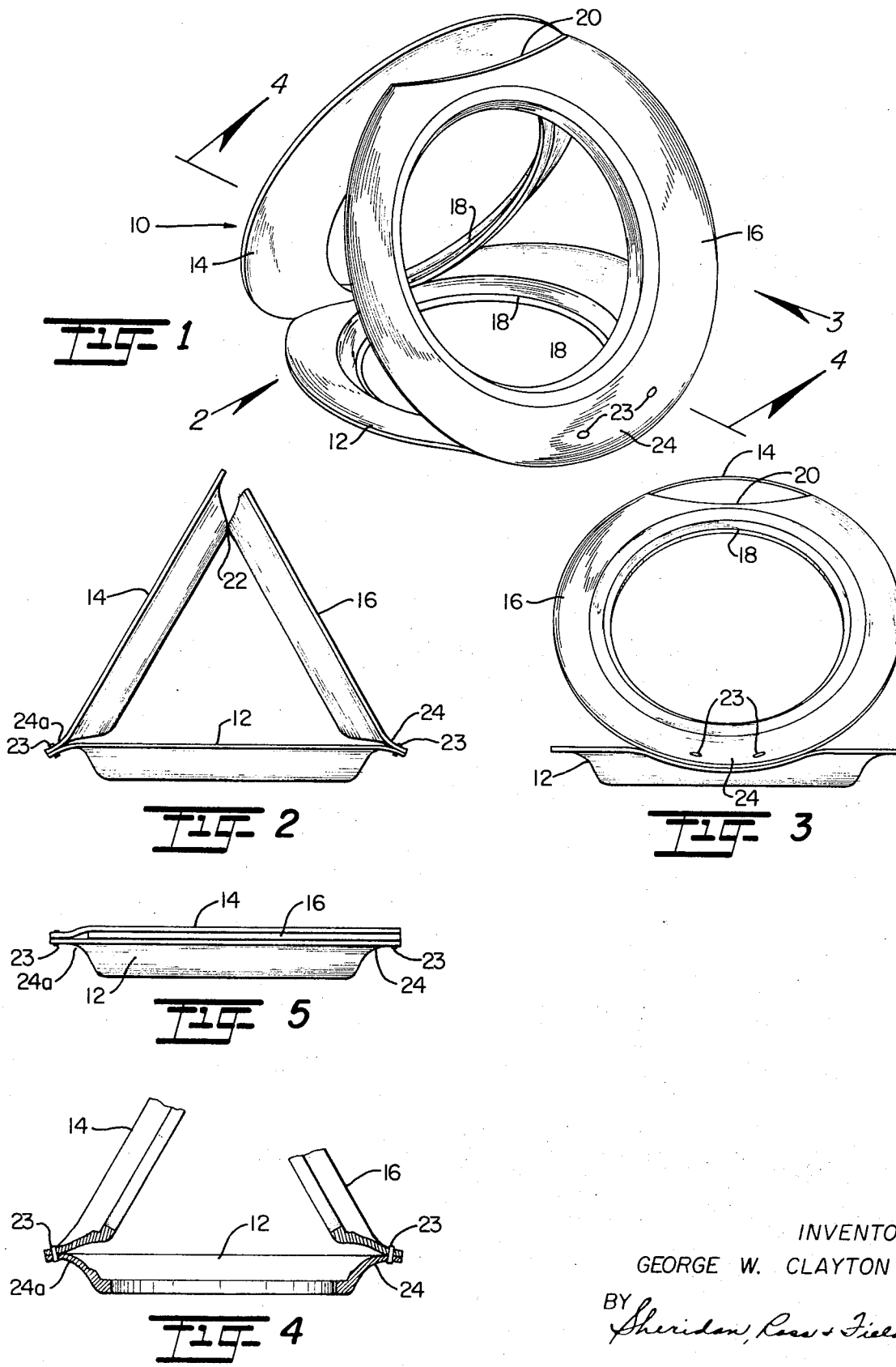

NESTABLE TRAFFIC MARKER

BACKGROUND OF THE INVENTION

In the channeling or detouring of vehicles along roadways it is conventional practice to place markers on the roadway along one or both edges of a desired temporary traffic channel. The number of markers required to establish the temporary channel is often extensive, such as when the roadway is under construction or repair. It is usually desirable, also, to deposit the space markers from a moving vehicle, and as quickly as possible, to minimize impeding movement of traffic while the temporary channel is being established. Since the marker depositing vehicle has limited storage space it is desirable that a maximum number of markers be disposed within such space. A common and well known expedient is to form the markers so they nest adjacent each other, as exemplified by U.S. Pat. No. 2,333,273 to Scanlon, to thus occupy a minimized space. The markers should also preferably be of flexible or resilient material so that if accidentally impacted by a vehicle they do not damage the vehicle, damage another vehicle, or injure personnel who may be in the vicinity. They should also preferably be inexpensive and, to reduce costs, discarded and modified vehicle tires have been proposed as markers, as exemplified by U.S. Pat. No. 3,475,009 to Brown. Both of the patents referred to suffer the disadvantage that when they are accidentally impacted by a vehicle or overturned by the wind they may not necessarily return to their desired normal and erect position.

SUMMARY OF THE INVENTION

The present invention utilizes the desirable general concept of saving storage space, as heretofore exemplified, by hinging the components of the marker into a generally flat and nesting relationship of minimized volume. It also utilizes the general concept of forming the marker from discarded tires which have low salvage value, thus producing a marker which is inexpensive and may also be fabricated near the myriad sources of such tires, thus minimizing transportation costs between the locus of manufacture and locus of use. Also, the tread portion of the tire, which is not utilized, may be reclaimed for its rubber content, thus utilizing all parts of the discarded tire for a useful and economic purpose. A further feature resides in securing the components, which are the side walls of the tire casing, together in such manner that their general planes form a three-sided pyramid, that is, a central vertical plane therethrough forms a generally isoceles triangle. With this construction, the marker is unstable in any position other than with one of its three planes disposed on the ground. Thus, if impacted, it will always return to an erect position with one of its three planes disposed on the ground.

One of the objects of the invention is accordingly, to provide an improved road marker which may be fabricated from used, defective or discarded pneumatic tire casings.

Another object is to utilize only the side walls of the tire, which have substantially no salvage value, and separate the tread portion therefrom, which has some salvage value for its rubber content, for reprocessing or reclaiming same.

Another object is to hinge the components together in such manner that they may nest in a generally flat configuration or be erected to a generally pyramidal configuration.

A further object is to utilize the natural resilience of the side walls to return the components to nested configuration and to so construct them to form locking means for retaining them in the erected configuration.

Still further objects, advantages, and salient features will become more apparent from the detailed description to follow, the appended claims, and the accompanying drawing, to now be briefly described.

BRIEF DESCRIPTION OF THE DRAWING

FIG. 1 is an isometric view of the subject of the invention in its erect configuration;

FIG. 2 is a side elevation as viewed in the direction of arrow 2, FIG. 1;

FIG. 3 is a side elevation as viewed in the direction of arrow 3, FIG. 1;

FIG. 4 is a fragmentary side elevation of FIG. 2, portions being shown in section, as taken on line 4—4, FIG. 1; and FIG. 5 is a side elevation showing the parts in nested relation while being stored or transported.

DESCRIPTION OF PREFERRED EMBODIMENT

Referring now to the drawing, marker 10 comprises three tire side wall members 12, 14, 16 each of which includes a bead 18. In the formation of these members peripheral cuts are made through the opposite side walls of the tire at a desired locus spaced from the tire tread peripheral side edges, thus forming two side walls which are separated from the tread portion. The latter, which forms no part of the invention, per se, may be discarded or reclaimed.

Members 12 and 14 may be identical, but member 16 is preferably further processed by cutting off a portion of its side wall to form an edge 20. Fastenings 23, such as screws or rivets, extend through adjacent side walls forming a pair of resilient hinges 24, 24a disposed diametrically opposite each other.

FIG. 5 illustrates the nested position of the rings with cut-out or edge 20 disposed at one side of hinge 24a. Thus, ring 16 nests within ring 12 and ring 14 nests within ring 16. As will now be more apparent, without cut-off 20 a portion of ring 16 would have been disposed between rings 12 and 14 at hinge 24a, thus preventing hinge action thereat.

FIGS. 1 to 4 illustrate the position of the rings in erected configuration. The hinges are now resiliently stressed, tending to move rings 14 and 16 toward nested position. Since they abut at locus 22, however, each forms a brace for the other, preventing rings 14 and 16 from moving to nested position.

When it is desired to nest the rings, ring 14 is moved to a substantially vertical position which permits edge 20 to clear ring 14 at the locus adjacent its bead and move beneath such bead to nested position. Ring 14 is then permitted to move to nested position on ring 16 under resilient urge of hinge 24a.

While the invention has been illustrated by a preferred modification in which reclaimed rubber casings and parts thereof are used, it is not limited to this material as the parts of the marker may be manufactured for specific use in the marker from material, such as, rubber, plastic and other material having some resiliency.

I claim:

1. A traffic marking device, comprising;
   a. first, second, and third rings of resilient material, the first ring adapted to rest on the ground with its bead facing same,
   b. means securing a portion of the second ring to a portion of the first ring to form a first hinge swingable about a horizontal axis,
   c. means securing a portion of the third ring to a portion of the first ring to form a second like hinge disposed substantially diametrically opposite the first hinge,
   d. the construction and arrangement being such that said second and third rings may be swung upwardly about their hinges to positions in which their general planes are disposed at acute angles to the general plane of the first ring with portions thereof in abutting relation for retaining same thereat, said second ring adapted to be swung to a stored position nesting within the first ring, the third ring adapted to be swung to a stored position nesting within the second ring.

2. The device of claim 1 wherein the rings are formed from the side walls of pneumatic tires, each ring including the bead and an annular portion thereof disposed between the bead and the tread portion.

3. A device in accordance with claim 2 wherein said hinges are formed by securing the respective portions together in abutting fixed relation, whereby hinge action is provided by resilient flexure of the walls adjacent thereto, the second ring having a portion cut off of same, forming an edge, said edge adapted to be disposed radially inwardly from second hinge when the rings are in nested relation.

4. A device in accordance with claim 2 wherein said edge is arcuate to conform to the curvature of the third ring at its locus adjacent said edge.

* * * * *